Figure 1:
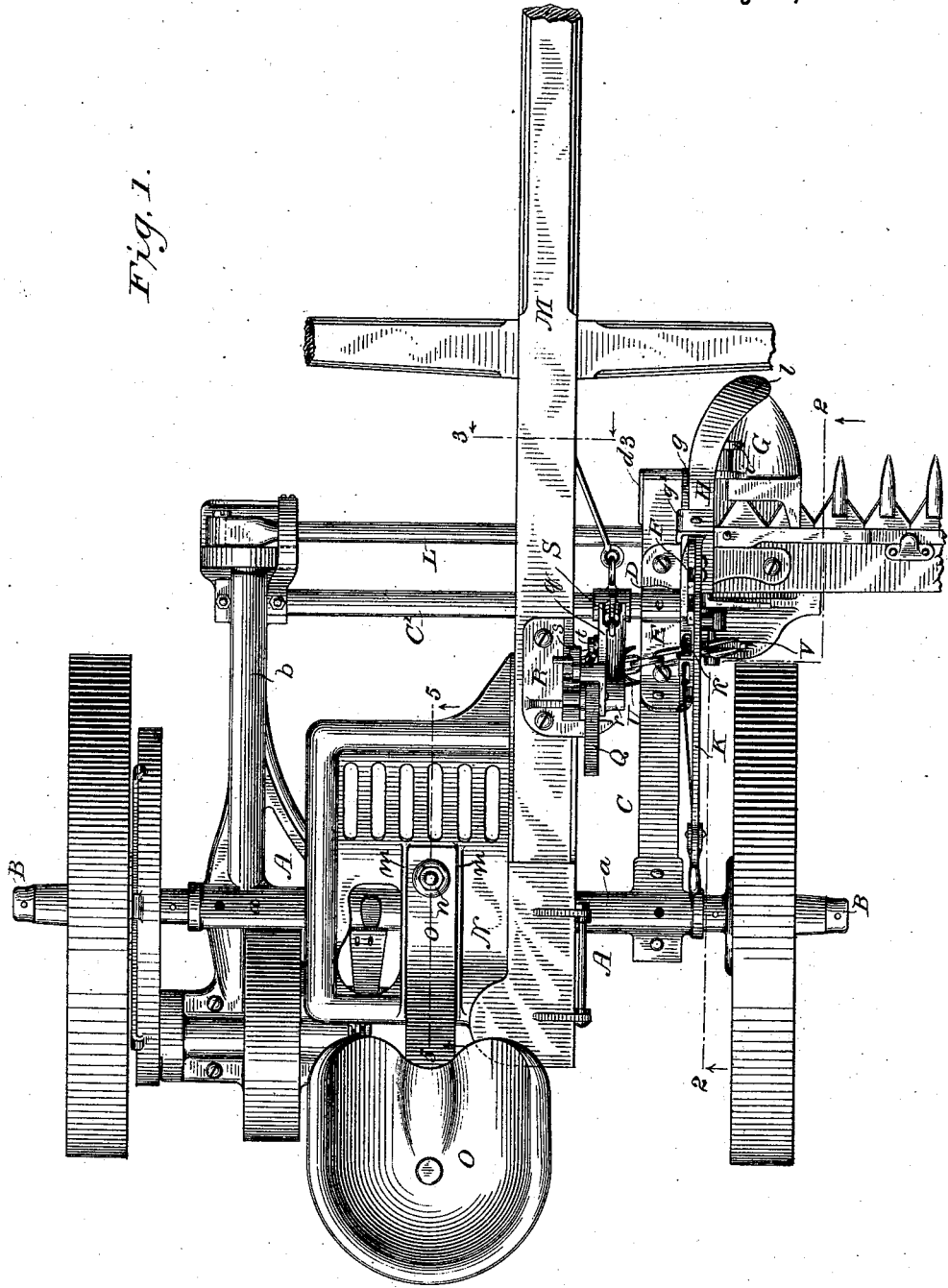

(No Model.) J. BORDWELL. 3 Sheets—Sheet 1.
MOWING MACHINE.
No. 301,796. Patented July 8, 1884.

WITNESSES
Wm A. Skinkle
Geo. W. Young

INVENTOR
Joseph Bordwell
By his Attorneys
Baldwin, Hopkins & Peyton

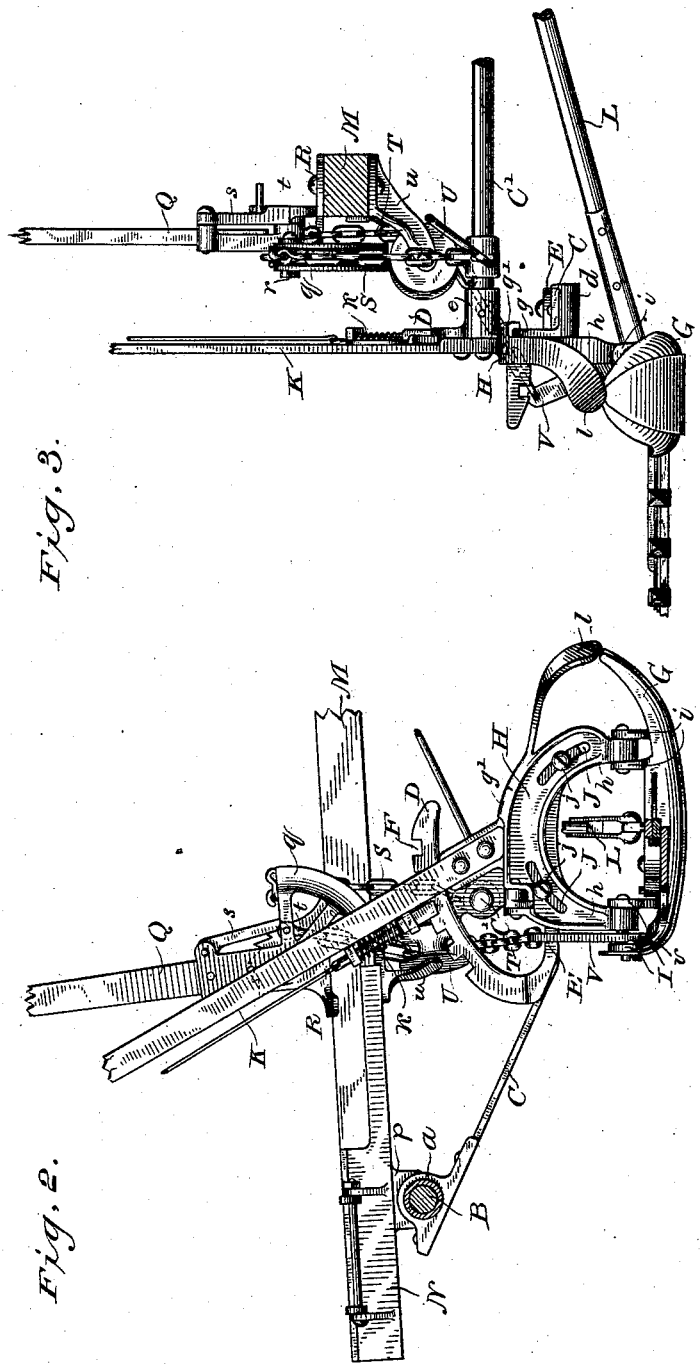

(No Model.) 3 Sheets—Sheet 3.
J. BORDWELL.
MOWING MACHINE.
No. 301,796. Patented July 8, 1884.
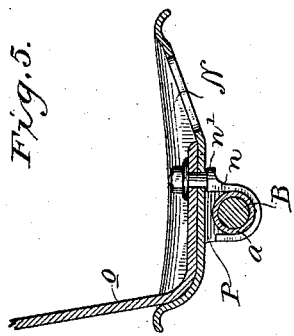
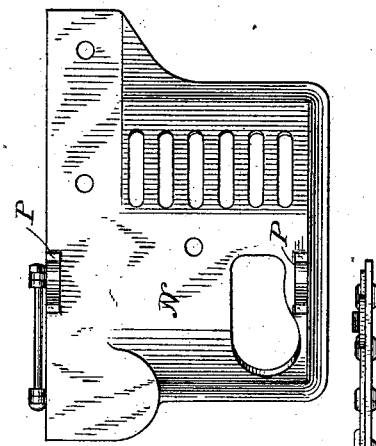
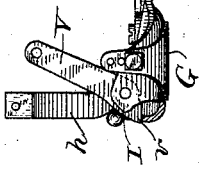
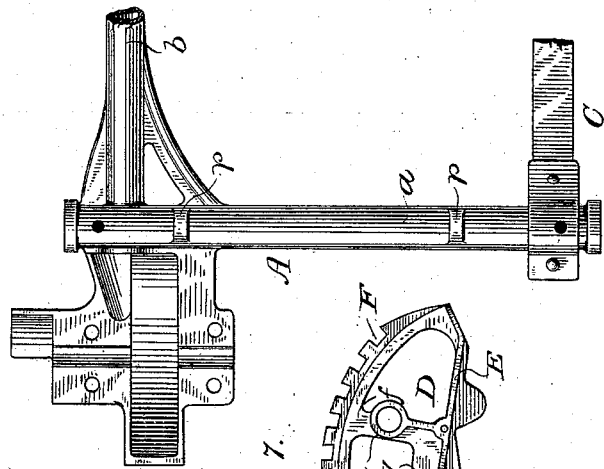
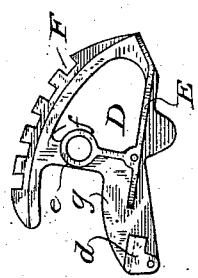
WITNESSES
Wm A. Skinkle
Geo W Young
INVENTOR
Joseph Bordwell.
By Attorney
Baldwin, Hopkins & Payton

UNITED STATES PATENT OFFICE.

JOSEPH BORDWELL, OF BROCKPORT, NEW YORK, ASSIGNOR TO DAYTON S. MORGAN, OF SAME PLACE.

MOWING-MACHINE.

SPECIFICATION forming part of Letters Patent No. 301,796, dated July 8, 1884.

Application filed November 17, 1883. (No model.)

*To all whom it may concern:*

Be it known that I, JOSEPH BORDWELL, of Brockport, in the county of Monroe and State of New York, have invented certain new and useful Improvements in Mowing-Machines, of which the following is a specification.

My invention relates to improvements in means for controlling the cutting apparatus (raising and lowering and rocking it) for deflecting grass away from the pitman, and for connecting the tongue and seat with the axle, all as hereinafter claimed.

My improvements are especially applicable to a front-cut machine such as that represented in United States Letters Patent granted to Rufus Dutton, February 11, 1868, No. 74,210.

In the accompanying drawings, Figure 1 is a plan view, parts being broken away. Fig. 2 is a side elevation with various parts omitted and other parts broken away, some parts being in section, as indicated by the line 2 2 of Fig. 1. Fig. 3 is a front elevation, partly in section on the line 3 3 of Fig. 1, showing, with the exception of the axle, the parts represented in Fig. 2. Fig. 4 is a plan view showing details of construction of the main frame. Fig. 5 is a view partly in elevation and partly in section on the line 5 5 of Fig. 1, showing details of the connection of the seat-standard and the tongue-frame and foot-plate with the axle-sleeve of the main frame. Fig. 6 is a bottom view of the tongue-frame and foot-plate. Fig. 7 is a side elevation of a frame-bracket with which the cutting apparatus has connection. Fig. 8 is a rear elevation with parts broken away, designed to show the lever which acts upon the shoe, and by means of which the outer end of the cutting apparatus is lifted in advance of the inner end.

Those features of a complete machine which are not shown by the drawings and are not herein described may be of any well-known and suitable construction. A main frame, A, is formed with an axle-sleeve, $a$, by which it is adapted to rock about the axle B, and has a crank-shaft bearing-sleeve, $b$, and an arm, C, constituting a push-bar or thrust-brace for the cutting apparatus. A frame cross-brace, C', having rigid connection with the forward ends of the crank-shaft sleeve and thrust-brace, completes the main frame. The cross-brace is bolted at one end to the crank-shaft sleeve, and has connection with the thrust-brace by means of a frame-bracket, D, of peculiar construction. This frame-bracket has a seat-socket, $d$, at its front end, into which the front end of the thrust-brace fits and is secured by a bolt, and has a seat-flange, E, resting upon the thrust-brace and bolted thereto. It will be seen that as the bracket embraces the thrust-brace above and below a very strong connection of the parts is made. A hub or short sleeve, $e$, is formed with the bracket to receive the end of the cross-brace, which is keyed therein. A curved detent-rack, F, is shown as formed in one piece with the bracket, this rack projecting upwardly and forwardly from the rear end of the seat-flange E, and being strengthened by the radial arm $f$, uniting it near its forward end with the sleeve portion of the bracket. This bracket is also formed with a vertical curved side rib, $g$, extending from its sleeve portion to its forward end, for a purpose soon to be explained.

The shoe G of the cutting apparatus is jointed to the arms $h\ h$ of an arched bracket, H, by means of two pairs of lugs, I I and $i\ i$, on the shoe, and pivots passing through the lugs and through the bracket-arms. Bolts or screws $j\ j$, passing through curved slots J J in the pivoted bracket H and into the frame-bracket D, and a flanged guide-lug, $g'$, engaging the guideway-rib $g$, serve to adjustably and strongly connect the two brackets. A lever, K, bolted at its lower end to the pivoted bracket, and the spring-detent $k$ of this lever for engaging with the rack F, enable the driver of the machine to rock the pivoted bracket about its guideway-connection with the frame-bracket, and correspondingly rock the cutting apparatus to elevate or depress the points of the guards and secure the parts in the desired position. The pitman L passes through the space between the arms of the pivoted bracket, and is connected, as usual, with the cutters. In order to protect the parts against clogging—as by the winding of grass about the pitman—a curved guard or deflector, $l$, is provided to direct the grass sidewise and away from the pitman. This deflector is rigidly connected at its inner end to the pivoted bracket, (it may be cast with the bracket, or separately made and secured in place,) and projects forwardly, curving downwardly and toward the cutting apparatus, and terminating close to the point of the shoe. The deflector does not bear upon the shoe, and consequently does not interfere with the movements of the shoe about the pivots in raising and lowering the cutting apparatus. The tongue M has jointed connection with the axle, so that it may be rocked independently of the rocking movements of the main frame. The tongue is rigidly secured to a tongue-frame or foot-plate, N, which is slotted and provided with a tool-box, as usual. The bent lower end of the spring-standard $o$ of the driver's seat O is fitted in a recess formed between ribs $m\ m$ of the tongue-frame, and is firmly held in place by a clip, $n$, provided with a bolt, nut, and washer, the hook or loop of the clip embracing the axle-sleeve $a$ of the main frame, as plainly shown. A shoulder, $n'$, on this clip prevents the binding of the tongue-frame and axle-sleeve together, so as to interfere with the rock of the tongue-frame about the axle. The clip, lugs $p\ p$ on the axle-sleeve, and lugs P P on the tongue-frame, having curved bearing-recesses semicircular, or nearly so, in form, and resting upon and partially embracing the axle-sleeve between and close to the lugs $p\ p$, serve to make a strong and simple jointed connection of the tongue-frame and main frame. A lever, Q, for raising and lowering the cutting apparatus, is provided with a segment-sheave, $q$, at its lower end, by the hub of which it is pivotally supported on the tongue. The pivot of the lever is formed by a stud, $r$, on a detent-bracket, R, secured to the tongue. A pawl, $s$, pivoted to the lever, and adapted to be tripped by the foot of the driver, engages the ratchet-teeth of the detent-bracket to hold the lever in its adjusted position. A chain, S, is secured at one end to the segment-sheave and at the other to the frame cross-brace C'. Another chain, T, is secured at one end to the sheave between its periphery and hub, by a pin or screw and hook, $t$. The connection of this chain with the segment-sheave is quite near its pivot, in order to give ample leverage. The chain T passes around a pulley, U, mounted to rotate between the arms of a bracket, $u$, suitably secured to the under side of the tongue and tongue-plate, and is connected at its lower end with the upper end of a lever, V, supported at the heel end of the shoe by being pivoted near its lower end between the rearmost one of the two shoe-lugs I and the rearmost arm, $h$, of the pivoted bracket H. The bent lower end or toe, $v$, of the shoe-lever bears upon the shoe inside of its pivot when operated. The relative lengths of the chains S and T are such that when the lifting-lever is operated the slack in the chain T is first taken up and the shoe-lever actuated before the chain S is drawn taut.

From the above description it will be understood that the first result of rocking the lifting-lever backward is to elevate the outer end of the cutting apparatus, after which the cutting apparatus is lifted at its inner end by the chain S, and throughout its length by the co-operation of the chains.

I am aware that it is not new, broadly considered, to employ in combination lifting-levers, segment-sheaves, pulleys, chains, and shoe-levers for elevating the outer ends before the inner ends of cutting apparatus, and I do not unqualifiedly claim such devices or combination of parts; neither do I unqualifiedly claim the combination of a lifting-lever, a chain acting upon a shoe-lever to lift the outer end of the cutting apparatus, and a chain for lifting the cutting apparatus at its inner end and throughout its length, in connection with the shoe-lever and its chain, as, broadly considered, such combination is older than my invention.

I claim as of my own invention—

1. The combination of the thrust-brace, the bracket D, rigidly secured thereto, and provided with the detent-rack, the rocking bracket having guideway-connection with the bracket secured to the thrust-brace, the lever provided with the detent and secured to the rocking bracket, and the shoe pivoted to the rocking bracket, substantially as and for the purpose hereinbefore set forth.

2. The combination of the axle, the rocking main frame provided with the crank-shaft sleeve, the thrust-brace, and the cross-brace, the frame-bracket D, rigidly connected with the thrust-brace and cross-brace, the pivoted rocking bracket having guideway-connection with the frame-bracket, the cutting apparatus, the rocking lever secured to the pivoted bracket, and its detent devices, substantially as and for the purpose hereinbefore set forth.

3. The combination of the thrust-brace, the bracket D, rigidly connected thereto, the pivoted rocking bracket having guideway-connection with the bracket secured to the thrust-brace, the shoe, and the deflector secured to the pivoted bracket, substantially as and for the purpose hereinbefore set forth.

4. The combination of the slotted rocking bracket having pivotal connection with the cutting apparatus, the thrust-brace, the cross-brace, and the frame-bracket rigidly connected with these braces, and provided with the detent-rack, and with the bolts, and the guideway-rib for engagement with the rocking bracket, substantially as and for the purpose hereinbefore set forth.

5. The combination of the axle, the axle-sleeve of the main frame, having the lugs $p\ p$, the tongue-frame, its recessed bearing-lugs P P, the shouldered clip, and the seat-standard, as and for the purpose hereinbefore set forth.

6. The combination of the axle, the main frame rocking about the axle, and provided with the crank-shaft sleeve, the thrust-brace, and the cross-brace, the tongue rocking about the axle independently of the rocking movements of the main frame, the lifting-lever and its segment-sheave, pivotally connected with the tongue, the detent devices of the lifting-lever, the chain connecting the segment-sheave with the cross-brace of the frame, the shoe having pivotal connection with the main frame, the shoe-lever, the chain connecting said lever with the segment-sheave of the lifting-lever, and the pulley around which said chain passes, substantially as and for the purpose hereinbefore set forth.

7. The combination of the tongue, the detent-bracket secured thereto, the lifting-lever pivotally connected with the detent-bracket and provided with the pawl, the bracket beneath the tongue, the pulley supported thereby, the chain connected with the lifting-lever and passing around said pulley, the shoe-lever to which the chain is attached, the shoe, and the thrust-brace with which it has pivotal connection, substantially as and for the purpose hereinbefore set forth.

In testimony whereof I have hereunto subscribed my name this 15th day of November, A. D. 1883.

JOSEPH $\overset{\text{his}}{\times}$ BORDWELL.
mark.

Witnesses:
 E. T. LAMB,
 H. C. HAMMOND.